3,647,616
STIFFENER AND PROCESS FOR STIFFENING
FLEXIBLE SHEET MATERIAL
John C. Zemlin, Reading, Mass., assignor to USM
Corporation, Boston, Mass.
Continuation-in-part of application Ser. No. 787,175,
Dec. 26, 1968. This application Feb. 6, 1970, Ser.
No. 9,168
Int. Cl. A43b *13/42;* B31f; B32b *27/40*
U.S. Cl. 161—190                               11 Claims

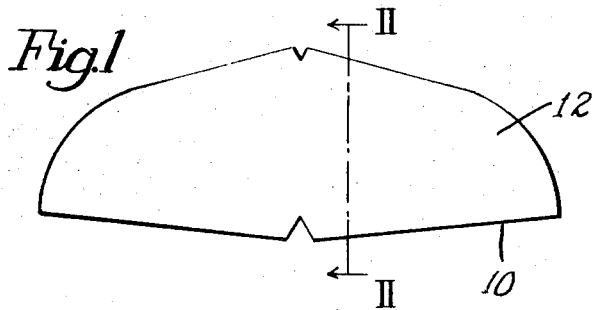
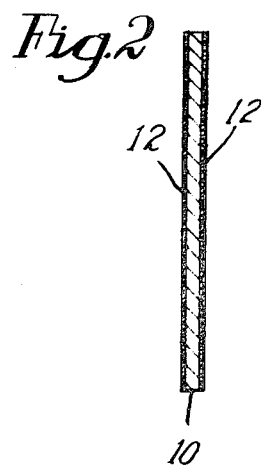
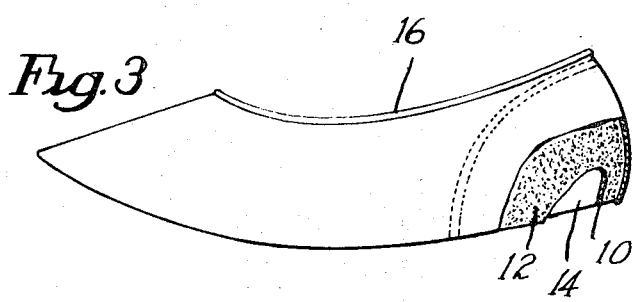
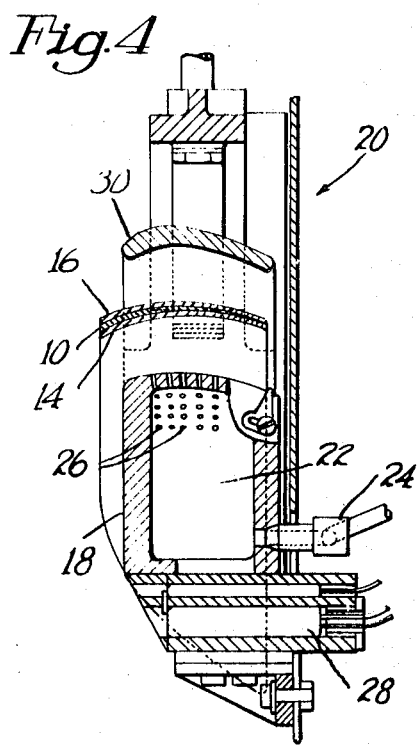
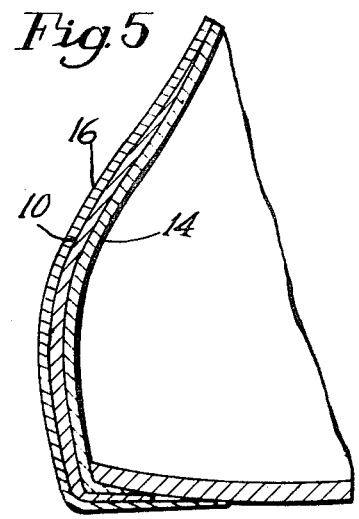
Inventor
John C. Zemlin
By his Attorney
Benjamin C. Pollard & nbsp;

ABSTRACT OF THE DISCLOSURE

Stiffener and stiffening process for flexible sheet material, particularly for parts of shoe uppers in which the novel stiffener is a normally stiff, resilient cross-linked cured polyurethane sheet with a layer of heat-activatable adhesive on its surface. The stiffener is heated to activate the adhesive and soften the polyurethane sheet to a rubbery state, the heated stiffener is pressed against a sheet material to establish adhesive engagement and the assembly of sheet material and stiffener is shaped and cooled to resilient, shape-retaining condition.

BACKGROUND OF THE INVENTION

This application is a continuation-in-part of my copending application Ser. No. 787,175 entitled "Stiffener and Stiffening Process," filed Dec. 26, 1968, now abandoned.

In the stiffening of shoe uppers, particularly the toe and heel ends, moldable sheet thermoplastic materials which are softened by heat or solvent are incorporated into shoe uppers prior to lasting, shaped in the course of lasting and allowed to harden to shape-retaining state before removal of the shoe upper from the last. A major defect in such thermoplastic stiffening materials is their thinning out when subjected to molding pressures in heated condition. Particularly in rounded portions of the counter and at the heel seat line of a shoe where the upper and a heat-softened thermoplastic counter is lasted around the sharp corners of the heel bottom of a last, the counter is substantially reduced in thickness and this provides a zone of weakness where greatest stresses are applied in wearing a shoe.

In my earlier application a sheet of normally solid partially cured polyurethane was disposed against a shoe part to be stiffened, was heated to soften it and render the stiffener surfaces adhesive and was then molded to a desired shape. The heating completed the cure to provide a strong resilient heat-resistant stiffener strongly bonded to the shoe part. A difficulty arising in practice of the process was the somewhat limited period during which the stiffener material remained heat fusible to allow bonding to the shoe parts.

SUMMARY OF THE INVENTION

It is an object of the present invention to provide a moldable stiffener layer or sheet particularly for use in stiffening shoes which will not thin out at areas where it is subjected to pressure while in moldable condition.

To this end and in accordance with a feature of the present invention, I have provided a stiffener in the form of a layer or sheet of cured cross-linked polyurethane material together with heat activatable adhesive on its surfaces in which the polyurethane material is convertible by heat to a rubbery state in which it can be conformed as a sheet but does not flow under pressure, and which, when cooled, will become stiffly resilient and shape retaining.

It is a further object of the present invention to provide a stiffening process particularly for shoes in which a sheet or layer of normally stiff material with adhesive on its surface is brought to conformable but not flowable condition by heat, is assembled against a member to be stiffened and is cooled to shape retaining resilient condition.

To this end and in accordance with a further feature of the invention a cured cross-linked polyurethane sheet stiffener material, which is normally stiffly resilient and which carries heat-activatable adhesive on its surface, is heated to activate the adhesive and bring the polyurethane to a pliable, conformable, but not flowable rubbery state and the stiffener is disposed against a surface, e.g. a part of the shoe upper to be stiffened. The shoe is shaped by applying pressure as by lasting the shoe upper to press the adhesive on the stiffener into wetting adhesive engagement with the surfaces of the part to be stiffened in the course of conforming the shoe upper and stiffener material to a lasting or other desired shape. Thereafter, the stiffener is hardened to stiffly resilient condition while maintaining the article to be stiffened, e.g. the shoe part in the desired shape.

PREFERRED EMBODIMENTS

The invention will be described in connection with the attached drawings forming part of the disclosure in the present case in which:

FIG. I is a plan view of a counter stiffener blank of the cured polyurethane material;

FIG. II is a cross sectional view on the line II—II of FIG. I showing the relation of the adhesive coats to the polyurethane sheet material;

FIG. III is a side elevational view with parts broken away of a shoe upper with the stiffener blank in place;

FIG. IV is a fractional side elevational view of a portion of a backpart molding device with a shoe upper with stiffener blank in place disposed between the molding surfaces; and FIG. V is a sectional view on an enlarged scale of the counter portion of a molded shoe upper showing the relation between the stiffener and the layers of shoe material.

The stiffener material and stiffening process of the present invention are useful in many relationships including the stiffening of fabrics in clothing, instrument cases and the like. However, the material and process are specially valuable in stiffening parts of shoe uppers such as counters, toes, eyelet strips and other shoe parts and the following description will refer to this use.

In the process of the present invention a stiffener blank of cured polyurethane sheet material 10 with heat activatable adhesive coatings 12 on its surface (see FIGS. I and II) is flexed and inserted between a counter pocket piece 14 and shoe upper 16 or assembled against any other area of a shoe upper 16 to be stiffened (see FIG. III). As discussed below the polyurethane sheet 10 forming part of the stiffener because of the strength and resistance to cracking may be sufficiently thin so that it is readily flexed at room temperature for insertion in the shoe upper although when molded to the three dimensional shape it provides a superior stiffening action.

With the stiffening 10 in place, the shoe upper 16 is placed on a form which may be a shoe last but which as shown in FIG. IV is a convex mold port 18 of a backpart molding machine 20 where it is subjected to heating to soften the polyurethane sheet 10 to a rubbery state and activate the adhesive coatings 12 on the surfaces. In the backpart molding machine 20 shown in FIG. IV, the convex mold part 18 has an exterior surface corresponding to the desired shape of the heel end of a shoe and is provided with an interior chamber 22 into which steam is supplied through the conduit 24 and from which steam is emitted through the holes 26 to supply heat and moisture to the shoe part to be molded. An electric heating cartridge 28 is also mounted in the lower portion of the mold port 18 to supply additional heat. With the shoe part in heated and moistened condition, and with the polyurethane sheet stiffener 10 in rubbery condition and the adhesive coatings 12 in activated condition, the end embracing band 30 is brought down to force the shoe upper 16 into intimate contact with the heated mold port 18 to impart the desired shape to the shoe part. When the shoe part has been shaped, the band 30 is loosened and the shaped shoe part is removed. When the thus shaped assembly is cooled it is found that it strongly resists efforts to deform it from the molded shape.

The first step in preparing the stiffener 10 of the present invention is forming an initially liquid mixture of components reactive to form a curable plastic such as a polyurethane. The reactive mixtures described in my earlier application when cured are useful in the present stiffener and stiffening process. As described in more detail in that application, one component may include normally liquid or readily liquefiable —NCO terminated prepolymer, preferably with admixed organic polyisocyanate; and the other component may include a normally liquid or readily liquefiable composition hereinafter referred to as "chain extender" providing a plurality of active hydrogen groups for reaction with the —NCO groups of the prepolymer. The components are mixed to form an initially liquid material which is spread in a layer of desired thickness, i.e. 15 to 60 mils, thin enough for incorporation in a portion of a shoe to be stiffened but thick enough to provide the necessary stiffness when cured, so that the mixture solidifies as a layer or sheet. Sheets of the solidified material may be cut into stiffener blanks of the desired shape for assembly against a member to be stiffened. If desired, the liquid mixture may be formed in a mold giving the desired thickness and outline and having tapered marginal portions.

A suitable —NCO terminated prepolymer may be made by mixing and reacting an organic compound providing a plurality of active hydrogens with an organic compound having a plurality of —NCO groups. Any of the commercial diisocyanates and diisocyanate mixtures may be used but it is preferred to use the liquid diisocyanates such as tolylene diisocyanate, methylene bis(4-phenyl isocyanate) in liquid form, 2,6 dimethyl diisocyanato methylcaproate and other liquid or readily liquefiable diisocyanates. A balancing of diols against amines is necessary to give toughness.

Difunctional active hydrogen compounds may be reacted with the organic isocyanate. However, for superior stiffness, toughness and heat-resistance in the final product it has been found preferable to include a substantial proportion which may be from 15% up to 100% of the active hydrogen compound of trifunctional active hydrogen compound, the percentage being percentage of equivalents of active hydrogen. Suitable trifunctional compounds include trimethylolpropane, glycerine, polypropylene glycol ether glycols, polytetramethylene ether glycols, ethylene oxide and propylene oxide adducts of difunctional aromatic phenols. The isocyanate material and the active hydrogen material are combined in a ratio to provide at least about two equivalents of —NCO for each equivalent of active hydrogen. Useful prepolymers may be prepared from reagents providing ratios of —NCO to —OH in the range of from 2:1 to 9:2.

It is desirable that the active hydrogen compounds be selected and proportioned so that the prepolymer formed by reaction with the —NCO compound will have an equivalent weight of less than about 500. This may be achieved by using a mixture of high molecular weight active hydrogen material such as one of the propylene glycol ether triols with low molecular weight material such as trimethylolpropane.

An additional proportion of a preferably liquid organic polyisocyanate such as tolylene diisocyanate or polyarylene polyisocyanate (PAPI) is ordinarily included along with the prepolymer at the time of mixing with the chain extender. The additional isocyanate is useful in reducing the viscosity to aid in mixing. The mixture of prepolymer and free polyisocyanate will be used in quantity to provide a slight excess up to about 20%, but preferably not more than about 10% excess of —NCO. That is, it is preferred to use a quantity of the mixture sufficient to provide about 1.1 equivalents of —NCO for each equivalent of active hydrogen in the chain extender. Also in a mixture providing the 1.1 equivalents of —NCO it has been found desirable to employ prepolymer in amount providing about 0.9 to 0.2 equivalent of —NCO and organic polyisocyanate in amount providing from 0.2 to 0.9 equivalent of —NCO. The excess of —NCO over the stoichiometric amount provides additional cross linking in the final product with resultant increase in heat resistance and shape retaining ability.

The material i.e. the "chain extender," for combination with the mixture of the —NCO terminated prepolymer and additional polyisocyanate, must have at least two active hydrogens per molecule. Useful chain extenders include for instance, polyols, polyamines and compounds containing both amine groups and hydroxyl groups. Also it appears important that the chain extender mixture include from about 5 mol percent to about 50 mol percent and preferably from about 10 mol percent to about 30 mol percent of an aromatic diamine such as methylene bis - orthochloroaniline, 3,3' dichlorobenzidine and orthoanisedine which will react with the polyisocyanate at a rate comparable to the reaction rate of the polyol material. That is, a too rapid amine reaction may build up excess urea groups which become insoluble in the mixture and may develop a gel structure. The balance to 100 mol percent of the chain extender mixture may be a polyol such as condensates of methylene bis-phenol with ethylene oxide or propylene oxide, or short chain polyester polyols such as di- or trifunctional condensation products of E-caprolactone with a low molecular weight diol such as ethylene glycol or propylene glycol, or a low molecular weight triol such as trimethylolpropane, glycerine and so on.

I have found that the degree of stiffness depends to a large extent on the amount of aromatic material incorporated in the reactive mixture. It is particularly preferred to use aromatic polymers as, for example, the condensation products of methylene bis phenol with ethylene- or propylene-oxide. It is also found that if excessive amounts, e.g. all of the chain extender, of aromatic polymers are used, the product will be brittle and easily fractured. 60 equivalent percent of aromatic polyol is the maximum desirable for most uses but products for special purposes can be made with as much as 80 equivalent percent. The tendency toward brittleness from use of aromatic polyols is reduced by the inclusion of aromatic diamines.

A further limitation on the use of aromatic polyols is the tendency of reaction mixtures including too high a percentage of these to have low softening points such that the stiffener compositions would soften noticeably in a shoe worn on a hot summer day. This difficulty can be overcome by addition of a significant amount, e.g. 10 to 40 equivalent percent of a poly E-caprolactone as chain extenders. It has been observed that compositions in which the reaction mixture includes lactones show a haziness. This is presumed to be due to development of a second phase so that the composition not only has a higher softening point but also has superior resistance to loss of shape when a shoe containing a stiffener formed of the composition is worn in a warm climate.

The above discussion is given to aid in understanding the invention; but, it is to be understood, the invention is not dependent on the accuracy of the explanation since combining the materials as disclosed gives new and useful results.

One or both of the components, i.e. prepolymer and chain extender to be mixed and reacted may include antioxidants and ultraviolet absorbers for their usual purposes. Also low cost fillers such as clays or silica may be included to reduce the cost of the composition.

It has also been found that addition of short fine fibers gives a substantial improvement in stiffness of the cured stiffener and reduces tendencies toward brittleness of the intermediate stage material. Useful results have been obtained with addition of from 1% to 15% by weight of fibers such as ⅛" long glass fibers or 1/16" long rayon fibers based on the weight of the reactive components.

The prepolymer, chain extender and, preferably also, free polyisocyanate are mixed in a suitable high speed mixer, and the mixture while still liquid is formed into a layer of suitable thickness, i.e. from about 0.015 to about 0.060 inch, usually on a release surface or the mixture may be cast in a mold as a stiffener blank of the desired thickness, outline and contour, e.g. having tapered edges.

After casting the liquid mixture, the components of the mixture are reacted to give a cured cross-linked material. The curing process ordinarily involves a brief relatively high temperature heating to, for example, about 220° to about 300° F. for as little as 15 seconds followed by further curing at lower temperatures, e.g. overnight at 150° F. or storage at room temperature for longer periods. For more efficient use of the casting surface or mold, the cast material may be cooled after the initial heating step and the solidified partially cured material stripped from the casting surface for completion of the curing in a suitable oven or other area.

The fully cured material is a stiff, resilient sheet material which will soften to a rubbery but not flowable state when heated to a temperature above its glass transition temperature. The reactive materials may be selected and proportioned by the chemist skilled in the art to form a product with a desired glass transition temperature and ordinarily it is preferred that the glass transition temperature be from about 140° F. up to 250° F. The glass transition temperature is customarily determined using a Differential Thermomechanical Analyzer (Model No. TA–940 Du Pont), in which a penetrating probe 0.025 inch in diameter is pressed against the material being tested with a 5 gram weight. The glass transition temperature is that temperature at which substantial penetration occurs. Normally, there is only one such point and it is pronounced and easy to recognize. Glass transition temperatures are selected to correspond to temperatures usable in a shoe factory in the handling of shoe materials. While the material softens to rubbery readily shapable condition by heating, the surface does not melt nor become tacky and the material does not flow under pressure.

One or both faces of the cured sheet material is or are provided with a heat-activatable adhesive. The adhesive may be applied in a variety of ways such as the coating of one or both faces with a solution of adhesive in a volatile solvent, the distribution of powdered hot melt adhesive on one or both faces of the sheet with heating either at the time of application or subsequently to fuse the powder to the sheet, or, the spreading of molten adhesive on the surface of the sheet or the lamination of a film of heat-activatable adhesive by assembling it against a face of the sheet and heating the assembly to cause the adhesive film to adhere to the face of the sheet. Applied layers of adhesive may be of the order of 0.005 inch in thickness. The adhesive may cover the entire face of the sheet or may be applied as a network or as spaced bodies such as dots or lines.

Useful adhesives are those which will bond to the stiffener and to a shoe part and which is heat activatable and include ethylene-vinyl acetate copolymers, thermoplastic urethanes, such as materials of the type commercially available as Estane, polyesters from condensation and polymerization of dihydroxy organic compounds with dicarboxylic acids or from polymerization of lactones such as E-caprolactone, and mixtures of these with themselves or with other thermoplastic resins, plasticizers, tackifiers, fillers, etc. The adhesive material will be selected or compounded to be heat activatable when brought to the temperature employed for converting the stiffener sheet material to rubbery state for shaping.

Stiffener blanks of the composite of stiffener sheet and heat-activatable adhesive are sufficiently flexible for incorporating in unlasted shoe uppers by the usual shoemaking methods. For counter stiffening, a counter stiffener blank 10 may be inserted in the pocket between a counter pocket piece 14 and shoe upper 16 or otherwise associated with the portion to be stiffened. The shoe upper 16 is thereafter shaped, for example, in a backpart molder 20, with the aid of heat which will raise the temperature of the upper 16 and of the stiffener 10 within the shoe to above the glass transition temperature of the polyurethane stiffener sheet. In this condition, the adhesive is activated and will bond strongly to the shoe upper material with which it is brought in wilting adhesive engagement by the shaping or lasting pressure. The resulting shoe possesses excellent resistance to heat deformation and will withstand even extreme flexing without cracking or permanent distortion.

The following examples are given to aid in understanding the invention, but it is to be understood that the invention is not restricted to the particular materials, proportions or procedures given in the examples.

Example I

An —NCO terminated prepolymer was prepared by reaction of 22 parts by weight of polypropylene glycol ether triol having a molecular weight of about 4000, 3 parts by weight of trimethylolpropane and 15 parts by weight of tolylene diisocyanate. The prepolymer was a viscous liquid at room temperature. 90 parts by weight of the prepolymer were combined with 13 parts by weight of tolylene diisocyanate, 63 parts by weight of an aromatic diol having an equivalent weight of 245, (Pluracol 245), from condensation of methylene bis phenol with propylene oxide, 8.5 parts by weight of methylene-bis-orthochloroaniline and .17 part by weight of lead 2-ethylhexoate as catalyst and thoroughly mixed. The mixture was spread in a sheet about 0.050 inch in thickness and heated for about one minute to a temperature of about 105° C. The cast material was then cooled giving a solid, pliable, non-tacky sheet. The cooled material was stripped from the casting surface and placed in an oven where it was held overnight at 150° F. When removed from the oven and cooled the material was stiff and resilient.

A release paper-supported film of heat-activatable adhesive comprising a mixture of equal parts of ethylene-vinyl acetate copolymer (Softening point 310° F., Ring and Ball, and vinyl acetate content of 27–29% by weight) and a terpene phenolic resin (melting point 265°–275° F.), 0.005" in thickness was assembled with the adhesive against a face of the polyurethane sheet and an iron heated to 275° was pressed against the release paper to cause the film to adhere to the sheet. The release paper was then stripped off.

A counter stiffener blank was cut from the composite sheet material and inserted in the counter pocket of a shoe upper. The shoe upper was then placed in a backpart molder where it was subjected to heat which raised the temperature of the shoe to about 200° F. to reduce the blank to rubbery condition and activate the adhesive and then molded to the desired shape. On completion of the shoe it was found that the counter portion retained its molded shape and that the stiffener adhered well to the shoe parts with what it was in contact. In use the counter withstood rough wear and extreme flexing without cracking or loss of shape.

Example II 20 parts of the —NCO terminated prepolymer of Example I were combined with 16.74 parts by weight of tolylene diisocyanate, 43 parts by weight of an aromatic diol from condensation of methylene bis phenol with propylene oxide having an equivalent weight of 245, (Pluracol 245), 5.8 parts by weight of methylene bis-orthochloroaniline and 0.84 part by weight of lead 2-ethylhexoate. The material was mixed, cast, heated and cured as in Example I and the cured sheet material was coated by brushing on a latex composition comprising 158 parts by weight of a 60% by weight solids emulsion of polyvinyl acetate and 5 parts by weight of butyl benzylphthalate as plasticizer. After drying of the applied adhesive coating, a counter stiffener blank was cut from the sheet, incorporated in a shoe upper and subjected to backpart molding as in Example I.

Having thus described my invention, what I claim as new and desire to secure by Letters Patent of the United States is:

1. Stiffener material for stiffening normally flexible sheet material comprising a normally stiff, resilient sheet of cross-linked, fully cured polyurethane from reaction and polymerization of mutually reactive materials including at least one organic compound having at least two —NCO groups and at least one organic compound having at least two active hydrogens and a layer of heat-activatable adhesive on a surface of said sheet, the polyurethane of said sheet having a glass transition temperature above temperatures encountered in use of a stiffened flexible sheet material but below temperatures which would harm said flexible sheet material, said polyurethane being pliable, rubbery and conformable, but not flowable on application of pressure at temperatures above said glass transition temperature and said adhesive being activatable by a temperature approximating said glass transition temperature.

2. Stiffener material as defined in claim 1 in which said polyurethane is the product of condensation and polymerization of an —NCO terminated prepolymer from condensation of mutually reactive materials including at least one compound having at least two active hydrogen groups and at least one compound having at least two isocyanate groups in proportion to provide at least about two equivalents of isocyanate for each equivalent of active hydrogen, additional polyisocyanate and a chain extender organic compound having at least two active hydrogens, the ratio of the sum of isocyanate groups from said prepolymer and isocyanate groups from said additional polyisocyanate to the active hydrogen of said chain extender being in excess of about 1:1, said polyurethane having a glass transition temperature of from about 140° F. to about 250° F.

3. Stiffener material as defined in claim 2 having a thickness and outline shape for incorporation in a portion of a shoe to be stiffened and adapted when heated above said glass transition temperature to be shaped with said shoe portion, to adhere itself to adjacent surfaces in said shoe portion and to harden when cooled to a stiffly resilient heat resistant condition to hold said shoe portion in which it has been shaped.

4. Stiffener material as defined in claim 3 in which said prepolymer is the product of reacting a diisocyanate with an organic compound having at least two active hydrogen groups, said organic active hydrogen material comprising at least 15% of trifunctional active hydrogen compound, and said diisocyanate and said active hydrogen material being combined in relative quantities to give ratios of —NCO to OH in the range from about 2:1 to about 9:2.

5. Stiffener material as defined in claim 4 in which said compound providing active hydrogen is the product of the condensation of ε-caprolactone with a low molecular weight diol or triol.

6. The process for stiffening a flexible sheet to hold it in a desired configuration comprising the steps of disposing in engagement with said flexible sheet a stiffener material comprising a normally stiff, resilient sheet of cross-linked, fully curved polyurethane and a layer of heat-activatable adhesive on a surface of said stiff resilient sheet, said polyurethane having a glass transition temperature above temperatures encountered in use of a flexible sheet stiffened with said stiffener materials but below temperatures which would harm said flexible sheet, said polyurethane being pliable, rubbery and conformable, but not flowable on application of pressure at temperatures above said glass transition temperature and said adhesive being activatable by heating to said glass transition temperature, heating said stiffener material to a temperature above said glass transition temperature, shaping said flexible sheet and stiffener material, pressing said layer of adhesive into wetting adhesive engagement with said flexible sheet and cooling said stiffener material while said flexible sheet and stiffener material are maintained in shape.

7. The process as defined in claim 6 in which said flexible sheet material is a portion of a shoe upper and said stiffener material has a thickness receivable within a shoe and sufficient to provide the desired stiffening action when cooled and said polyurethane has a glass transition temperature of from about 150° F. to about 250° F.

8. The process as defined in claim 7 in which said stiffener material has an outline shape for assembly against the area of the shoe part to be stiffened, said stiffener is assembled as an inner layer of said shoe part and heat is supplied to exposed portions of the shoe part assembled with said stiffener before molding the shoe upper.

9. The process as defined in claim 8 in which said polyurethane material is the product of condensation and polymerization of an —NCO terminated prepolymer from condensation of mutually reactive materials including at least one compound having at least two active hydrogen groups and at least one compound having at least two isocyanate groups in proportion to provide at least about two equivalents of isocyanate for each equivalent of active hydrogen, additional polyisocyanate and a chain extender organic compound having at least two active hydrogens, the ratio of the sum of isocyanate groups from said prepolymer and isocyanate groups from said additional polyisocyanate to the active hydrogen of said chain extender being in excess of about 1:1.

10. The process as defined in claim 9 in which said prepolymer is the product of reacting a diisocyanate with an organic compound having at least two active hydrogen groups, said organic active hydrogen material comprising at least 15% of trifunctional active hydrogen compounds, and said diisocyanate and said active hydrogen material being combined in relative quantities to give ratios of —NCO to OH in the range of from about 2:1 to about 9:2.

11. The process as defined in class 10 in which said compound providing active hydrogen is the product of the condensation of E-caprolactone with a low molecular weight diol or triol.

References Cited

UNITED STATES PATENTS

| | | | |
|---|---|---|---|
| 2,866,774 | 12/1958 | Price | 260—77.5 |
| 3,170,252 | 2/1965 | Ravich | 36—68 |
| 3,234,668 | 2/1966 | Radcliffe | 36—68 |
| 3,356,650 | 12/1967 | McElroy | 260—77.5 |
| 3,418,188 | 12/1968 | Hogg et al. | 161—190 X |
| 3,427,733 | 2/1969 | Beckwith | 36—68 |
| 3,467,976 | 9/1969 | Jonas | 36—68 |

OTHER REFERENCES

Dombrow, B. A., "Polyurethanes," Reinhold Publishing Co., N.Y. City, Copyright 1957, pp. 97–99, 114, 115 and frontispiece.

JOHN T. GOOLKASIAN, Primary Examiner

C. B. COSBY, Assistant Examiner

U.S. Cl. X.R.

12—146 D; 36—68, 77 M, 77 R; 156—221, 309, 331

PO-1050
(5/69)

UNITED STATES PATENT OFFICE
CERTIFICATE OF CORRECTION

Patent No. 3,647,616                              Dated March 7, 1972

Inventor(s) John C. Zemlin

It is certified that error appears in the above-identified patent and that said Letters Patent are hereby corrected as shown below:

Column 8, Claim 6, Line 5, and after fully "curved" should
        be -cured-

Column 8, Claim 11, Line 1, and after in "class" should
        be -claim-

Signed and sealed this 4th day of July 1972.

(SEAL)
Attest:

EDWARD M. FLETCHER, JR.                    ROBERT GOTTSCHALK
Attesting Officer                          Commissioner of Patents